Sept. 16, 1952     G. L. L. SMITH     2,610,898

TRACTOR LUG

Filed July 6, 1950

GEORGE L.L. SMITH

*INVENTOR*

BY *Herbert J. Brown*

*ATTORNEY*

Patented Sept. 16, 1952

2,610,898

UNITED STATES PATENT OFFICE 2,610,898

TRACTOR LUG

George L. L. Smith, Dallas, Tex.

Application July 6, 1950, Serial No. 172,242

3 Claims. (Cl. 301—47)

This invention relates to traction lugs mounted on the driving wheels of pneumatic tired tractors.

Although many devices have been employed for increasing the traction of pneumatic tired tractors, such prior devices have not been entirely satisfactory. Projecting lugs of the type referred to must be removed or retracted inwardly of the circumference of the tires when driving on pavement so as not to damage the latter. Also, greater speeds may be attained when only the pneumatic tires are in contact with the pavement. On the other hand, the deep tread designs in tractor tires do not always provide sufficient traction when driving in mud, loose gravel, and on wet vegetation. The prior devices referred to were objectionable in that they consumed considerable time when such lugs were detachably mounted on or removed from the wheels, or were objectionable in those types of lugs which were extensible and retractable in that the wheels had to be jacked up when making the changes.

An object of the invention is to provide an improved mechanism for traction lugs mounted on the driving wheels of pneumatic tired tractors whereby the lugs may be readily and conveniently extended and retracted.

Another object of the invention is to provide, in a mechanism of the described class, a construction and arrangement whereby the power of the tractor may be employed for extending and retracting the lugs.

A further object of the invention is to provide a relatively simple and inexpensive mechanism for the described purpose which may be installed on almost all makes of tractors in the form of accessory equipment.

The invention will be more readily understood by reference to the accompanying drawings and the following description.

Figures 1, 2:
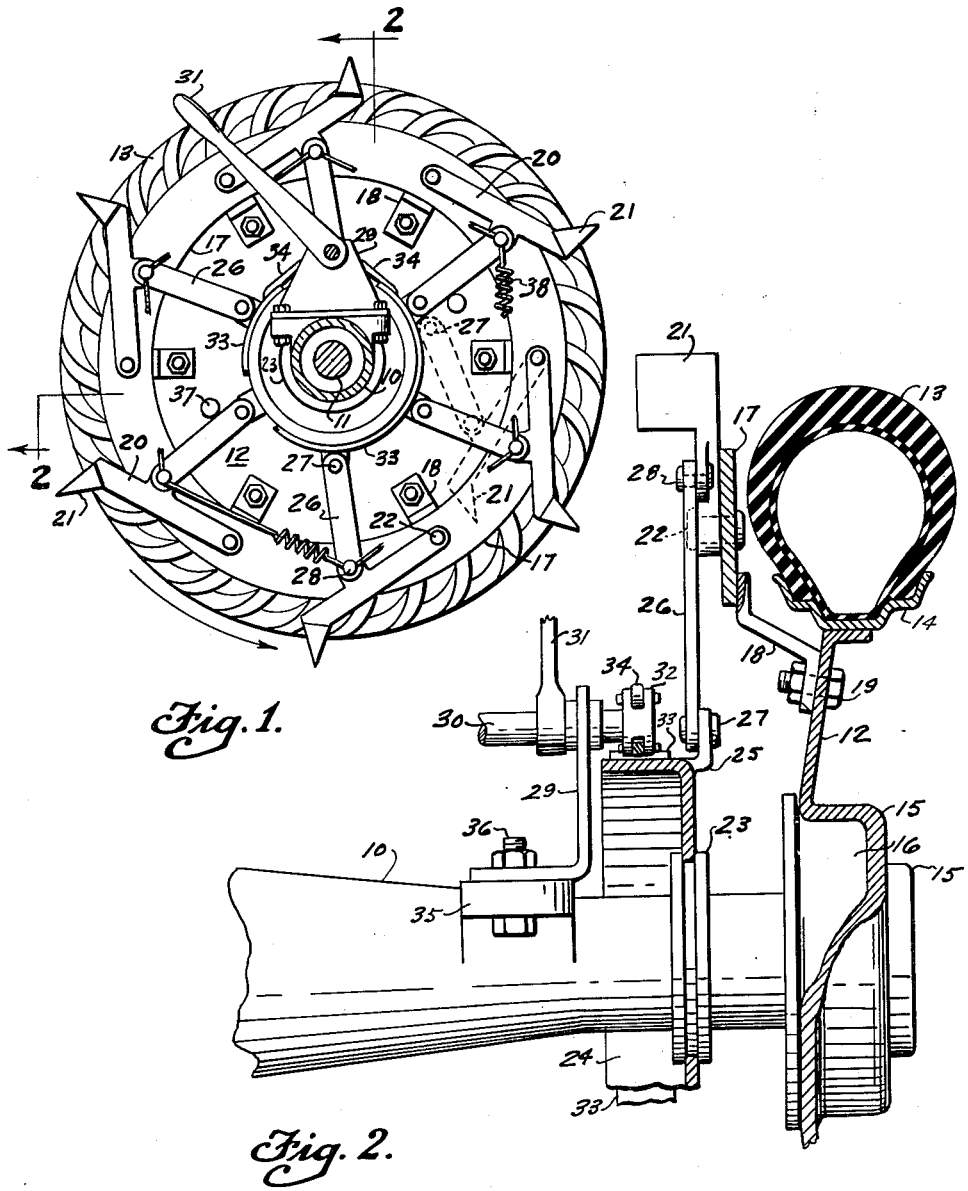
Figure 1 is an inside elevation of a pneumatic tired tractor wheel embodying an exemplary form of the invention.
Figure 2 is an enlarged sectional view taken approximately on line 2—2 of Figure 1.

In the drawing, the numeral 10 indicates the axle housing in which the axle 11 is mounted. The drive wheels 12, including pneumatic tires 13 mounted on the wheel rims 14, are secured to the outer ends of the axle 11 in the usual manner, and as shown in Figure 2, and have their hubs 15 mounted on the brake drums 16 of the tractor.

The inside of each wheel 12 is provided with a flat mounting ring 17, the outer diameter of which is less than the circumference of the tire 13. The mounting rings 17 are secured in their described positions by means of angular brackets 18 welded at corresponding ends to said rings and are secured to the wheels 12 by means of bolts 19. Lug arms 20, having projecting lugs 21 integral with their outer ends, are pivotally secured to the ring 17 by means of pivot pins 22 positioned through the inner ends of said arms. The projecting lugs 21 are wedge shaped and are arranged with their apex ends parallel with the axis of rotation of the wheel and which arrangement provides for self cleaning of the lugs. Preferably, each arm 20 is disposed at an angle with respect to a center line through its pivot pin 22 and the center of the axle 11, and arranged so that said arms are in tension when the tractor is moving forwardly. The last referred to arrangement is shown in the lower portion of Figure 1 where an arrow indicates the forward rotation of the wheel 12.

Around the axle housing 10 and inwardly of the tractor's brake drum 16, there is a grooved annular stationary bearing 23 in which an auxiliary brake drum 24 is mounted for free rotation. Ears 25 extend outwardly from the drum 24 and pivotally connect corresponding ends of actuating arms 26 by means of pivot pins 27 positioned therethrough. The outer ends of the actuating arms 26 are pivotally connected with the lug arms 20 by means of other pivot pins 28. When the lugs 21 are extended, it will be noted that the inner pivot pins 27 are located outwardly of imaginary center lines drawn through the center of the axle 11 and the centers of the respective outer pivot pins 28 so as to lock the lugs in position. By means of dotted lines in Figure 1, one of the lugs 21 is shown in a retracted position and shows the inner pivot pin 27 positioned on the opposite side of the imaginary center line, last referred to. As will become apparent, all lugs 21 operate in unison and are all extended or are all retracted at the same time.

Upwardly projecting brackets 29 are mounted on the axle housing 10 inwardly of the auxiliary brake drums 24 and rotatably support a shaft 30 having a lever 31 secured thereon and positioned for convenient operation. Bell cranks 32 are secured on the outer ends of the shaft 30 and are connected with the ends of brake bands 33 around the auxiliary brake drums 24 by means of straps 34. In most makes of tractors, projecting bosses 35 are provided integral with the axle housing 10 and to which the shaft bracket 29 is secured by means of bolts 36; however, any suitable means may be employed for the last referred to attachment.

Inwardly projecting stops 37 may be welded or otherwise secured to the inner faces of the wheel 12 and arranged to limit the outward movement of the lugs 21 by engaging and limiting the movement of the actuating arms 20. Spring means may also be provided to tend to hold the lugs 21 in their retracted positions, and which arrangement may be conveniently carried out by connecting tension springs 38 between the pivot pins 28 on the outer ends of the actuating arms 26.

In operation the lugs 21 may be extended by operating the lever 31 and frictionally engaging the bands 33 with the auxiliary brake drums 24 when the tractor is moving forwardly. This action causes the brake drums 24 to stop and to move the inner pins 27 relative to the wheels 12. To retract the lugs 21 the brake bands 33 are applied to the auxiliary drums 24 when the tractor is in reverse. When the lugs 21 are either fully extended or fully retracted, the power delivered by the wheels 12 will overcome the frictional engagement between the bands 33 and the auxiliary brake drums 24, and at which time the operator releases the said bands.

The present invention is not limited to the specific construction herein shown and described, but may be made in many ways within the scope of the appended claims.

What is claimed is:

1. In combination with a vehicle drive wheel having a pneumatic tire mounted thereon, lug supporting arms pivotally supported at corresponding ends thereof on said wheel and inwardly of the circumference of said tire, outwardly projecting lugs secured on the ends of said lug supporting arms opposite their said pivoted ends and adapted to extend outwardly of the circumference of said tire when said lug supporting arms are pivotally extended, a rotatable support mounted around the axial center of said wheel and adapted to be actuated in either direction, radially disposed actuating arms pivotally connected at the inner ends thereof with said rotatable support and having their remaining ends pivotally connected with said lug supporting arms between the ends thereof, and stop means projecting from said wheel, said stop means being positioned to limit the movement of said pivoted connections between said rotatable support and said actuating arms to one side of an imaginary line drawn through the axial center of said wheel and said pivotal connections between said actuating arms and said lug supporting arms when said rotatable support is actuated in a direction to extend said lugs.

2. In combination with a vehicle drive wheel having a pneumatic tire mounted thereon, lug supporting arms pivotally supported at corresponding ends thereof on said wheel and inwardly of the circumference of said tire, outwardly projecting lugs secured on the ends of said lug supporting arms opposite their said pivoted ends and adapted to extend outwardly of the circumference of said tire when said lug supporting arms are pivotally extended, said lugs being wedge shaped and having the apex ends thereof arranged parallel with the axis of rotation of said wheel, a rotatable support mounted around the axial center of said wheel and adapted to be actuated in either direction, radially disposed actuating arms pivotally connected at the inner ends thereof with said rotatable support and having their remaining ends pivotally connected with said lug supporting arms between the ends thereof, and stops projecting from said wheel, said stops being positioned to limit the movement of said pivotal connections between said rotatable support and said actuating arms to one side of an imaginary line drawn through the axial center of said wheel and said pivotal connections between said actuating arms and said lug supporting arms when said rotatable support is actuated in a direction to extend said lugs.

3. For use in combination with a vehicle drive wheel, a retractable lug and actuating mechanism therefor carried by said vehicle wheel, including a lug arm pivotally mounted adjacent one end thereof near the outer periphery of the wheel and having a ground engaging lug projecting angularly outwardly from the opposite end of said arm, and means for swinging said lug arm and lug about the pivot point of the lug arm to operative or inoperative positions, said means comprising a rotatable member coaxial with the vehicle wheel and mounted for rotation in either direction relative to the wheel, an actuating arm pivoted at one end to said lug arm and pivotally connected at its other end to said rotatable member, whereby on rotation of the member in one direction the lug carried by said lug arm is moved to operative ground engaging position by said actuating arm and on rotation in the opposite direction the lug and lug arm are retracted, and stop means for limiting the movement of said actuating arm when the parts are in operative position with the lug projected, to a position in which a line through the two pivot points of the actuating arm passes slightly beyond the center of said rotating member.

GEORGE L. L. SMITH.

REFERENCES CITED

The following references are of record in the file of this patent:

UNITED STATES PATENTS

| Number | Name | Date |
|---|---|---|
| 1,488,333 | Force et al. | Mar. 25, 1924 |
| 2,118,269 | Schlenter | May 24, 1938 |
| 2,178,105 | Maxwell | Oct. 31, 1939 |

FOREIGN PATENTS

| Number | Country | Date |
|---|---|---|
| 484,356 | Great Britain | May 4, 1908 |
| 836,791 | France | Oct. 25, 1938 |
| 474,326 | Germany | Sept. 22, 1927 |